Aug. 2, 1949.   T. GROGAN ET AL   2,477,871
HANDLING TRUCK
Filed Nov. 26, 1945
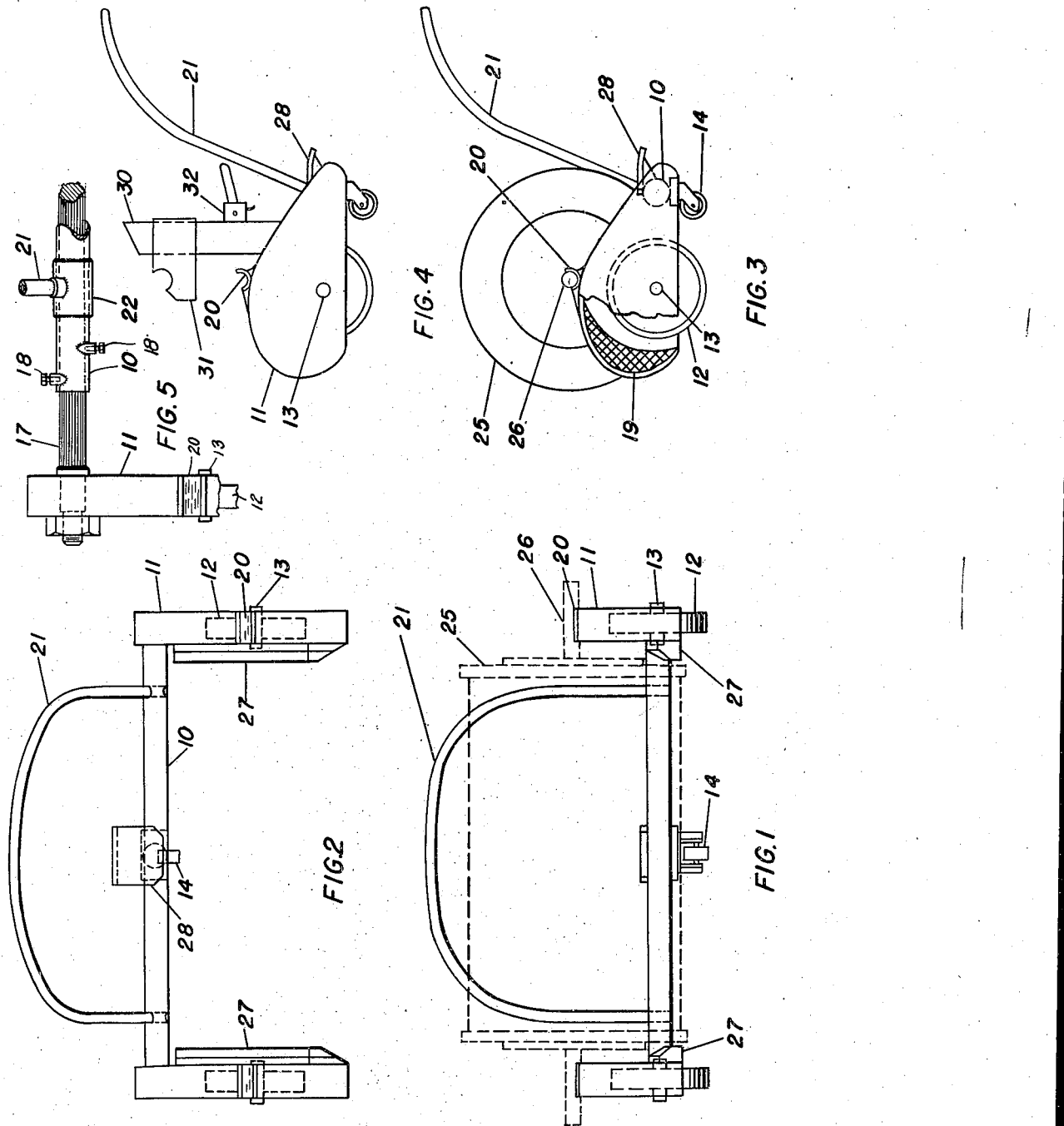
INVENTOR
TOM GROGAN
BY   THOMAS MAYNER
ATTORNEY Patented Aug. 2, 1949

2,477,871

UNITED STATES PATENT OFFICE 2,477,871

HANDLING TRUCK

Tom Grogan, Cleveland, and Thomas Mayner, Willoughby, Ohio, assignors to Industrial Rayon Corporation, Cleveland, Ohio, a corporation of Delaware Application November 26, 1945, Serial No. 630,840

7 Claims. (Cl. 214—65)

This invention relates to a movable supporting device such as a handling truck. More particularly, the invention relates to a handling truck employed in the movement of articles having stub shafts extending from their ends such as spools, warp beams, and cloth rolls, and whether such articles are equipped with flanges or not.

The large spools, warp beams, or cloth rolls are usually placed onto the platform of a dolly by means of overhead cranes or are rolled onto the dolly from some higher position. This handling operation ordinarily requires at least two persons. In addition, the cylindrical surface of the filled spools, beams, or cloth rolls is generally placed in contact with the dolly and serves to support the full load of the spool, beam, or cloth roll. Consequently, there is serious danger that the yarn, cord, or cloth collected on these devices will be damaged during the handling operation, and in addition the cylindrical shape of the yarn, thread or cloth wound on these articles will be distorted. The resulting eccentricity causes difficulty, for example, when yarn or cord is withdrawn from a warp beam in the course of a warping operation since it generally results in uneven tension of the warp ends. In using dollies there is also the danger that the cylindrical articles may roll off the dollies unless the articles are properly wedged or the dolly platform is properly curved.

This invention avoids the above-mentioned difficulties and advantageously provides a handling truck that is operated by a single individual and one that is substantially self-loading and unloading. The truck is particularly adapted for the lifting and movement of cylindrical or other types of articles having stub shafts extending from their ends. The truck makes possible the carrying of the full load of the articles by the stub shafts rather than by the cylindrical surface of the article. Further, the handling truck is balanced so as to require a minimum of effort by the operator to load or to unload it. Also, when the truck is once loaded it carries the full weight of the load requiring only a pushing effort by the operator.

The invention further provides other advantageous features such as the adjustability of the truck width to accommodate articles varying in length, as well as a vertical adjustment for articles of varying diameters or for lifting such articles from positions other than the floor.

The details of the invention will be better understood by reference to the following description in connection with the accompanying drawing where:

Figure 1 is a front elevation of the truck with a superimposed warp beam in position;

Figure 2 is a plan view of the truck;

Figure 3 is an end view, partly in section, of a loaded truck;

Figure 4 is an end view of the truck showing a vertically adjustable carrying means;

Figure 5 is a fragmentary view, in plan, of a further modification of the truck showing the width-adjusting means.

Referring to the drawing, the truck frame which is preferably U-shaped comprises a tubular frame member 10, and side members 11 attached to the ends of the tubular member. All of the members are, desirably, of steel construction although other materials may be used. The side members 11 comprise metal hoods of welded steel construction substantially encompassing wheels 12 mounted therein. The side members 11 may be otherwise constructed than shown, however, a hood type construction is simple and provides great rigidity and strength. On each hood 11 there is mounted a stub shaft holder or rest 20. The length of the holder 20 for greater strength is substantially equal to the width of a hood 11. As stated, each hood 11 contains a wheel 12 mounted for rotation therein on a shaft 13 which extends through the sides of the hood. A third wheel 14, of the swivel type, is fixed to substantially the center of the main frame member 10. Wheel 14 thus serves as a pivot wheel of the truck. The wheels 12 in the side members are preferably larger in diameter than the swivel wheel 14 inasmuch as they are designed to carry the greatest portion of a load that may be imposed upon the truck.

The hoods 11 are fixed, as by welding, to the main frame member 10 at substantially their ends. The distance between the rests 20 and the frame member 10 should be greater than the radius of the article or articles that the truck is to carry so that the frame member 10 is not contacted during loading. In Figure 1, there is shown, superposed, a cylindrical article 25 such as a flanged warp beam in position on the truck. The warp beam is supported in the truck by its steel stub shafts 26 resting in the holders 20. The main member 10 is, of course, of such length so as to accommodate the warp beam 25 and the hoods 11 are of such height so as to raise the warp beam sufficiently high off the floor to permit a free movement thereof. However, where articles vary in length the main member 10 may be made extensible in order to accommodate them. Also, a vertical adjustable means may be provided for objects of varying diameters. These modifications will be hereinafter further explained.

Mounted on each hood 11 is a substantially semicircular shell 20 designed as a stub shaft rest or holder. The rest 20 is preferably as long as the width of the hood 11 and is mounted thereon in a forwardly tilted position to enable the truck operator to more easily slip the rest 20 underneath a stub shaft. The rests or holders 20 may be designed to accommodate end stub shafts of varying diameters within a defined range. For articles to be lifted off the floor only a slight distance, holder 20 is preferably located on top of the hoods 11, some distance back of a vertical center line passing through the wheels 12 in order that the center of gravity of the article being moved will fall between the shafts 13 of the wheels 12 and the swivel wheel 14. With the center of gravity of a loaded truck preferably located somewhere between the forward and rear wheels but nearer the vertical center line of the wheels 13, most of the weight then is, desirably, borne by these wheels. It will be noted that wheels 13 are made considerably larger than the wheel 14 to provide a greater bearing area for the load which the truck is to carry. Thus, the pivot wheel 14 will carry but a small amount of the total load enabling the operator to maneuver the truck with relative ease.

Further, the hoods 11 may be provided with inside guide members 27. These guide members may be of wood or some tough and resilient material in order not to damage the flanges of a spool or warp beam, and they are desirably tapered at their forward ends to permit an unobstructed guiding of the truck about articles just prior to lifting the articles on the rests 20.

A wide, curved handle 21 is provided for the maneuvering of the truck. The ends of the curved bar forming the handle may be inserted into the frame member 10 and welded in such position; or where the truck is adjustable in width, sleeves 22 having a boss that has a hole adapted to admit the ends of the handle 21 may be utilized. The use of sleeves 22 permits an exterior assembly of the handle to the frame member; the handle then will not interfere with the movement of splined members which may be attached to the hoods 11 and which would move within the frame member 10. This modification is shown in Figure 5. Splined rod members 17 may be rigidly attached to the side hood members 11 in any desirable manner such as by welding or by means of a nut threaded on the end of the splined member. The ends of the main frame member 10 are correspondingly splined to receive the rods 17. A setscrew 18 threaded through the frame member 10 is provided to fix the readjusted position of the splined rod members 17. Thus the width of the truck can be readjusted to accommodate a longer or shorter article.

By way of an example to demonstrate the use of the truck, the truck is maneuvered by the operator toward an article such as a warp beam 25 in such manner that the side members 11 substantially encompass the flanges of the warp beam. The truck sides slip about each flange of the warp beam until the hoods 11 substantially abut the warp beam shaft ends. The operator then raises the truck handle thereby pivoting the truck forward on the front wheels 12 until the shells or rests 20 are lower than the stub shafts of the article to be lifted. The truck is then slipped underneath the stub shaft ends. With the rests 20 under the stub shafts, the operator then applies his weight to the top of the handle 21 pivotally lifting the warp beam quickly into position. The depression of the handle 21 raises the warp beam off the floor and throws the weight of the warp beam back of the center line of the front wheels 12. The loaded truck is then easily maneuvered to any other desired position.

In order to minimize the exertion that would be required by the operator to lift an article such as a warp beam, the truck is substantially counterbalanced. As shown in Figure 3, the interior forward section of each hood is weighted with additional material 19, such as lead or an iron casting, molded to fit into the hood contour. The forward part of the truck is thus weighted to substantially offset the truck weight that the operator would be required to lift when performing the loading operation. This counterweighting, plus the fact that ordinarily a warp beam need only be raised but a slight distance off the floor, permits the operator to handle the truck quickly and easily.

Further, in order to avoid an overturning of the truck when it is raised and slipped under the stub shaft ends, the hoods 11 extend lengthwise beyond the wheels 12 a desired distance so that the truck rests upon the hood ends in the event it is raised off the wheels 12. Also, to enable the operator to more easily slip the stub shaft rests 20 under the stub shafts, the space on the hood before each rest 20 is filled in with weld and then smoothed so that the shaft's ends can readily slip thereover into the rests 20. A small foot plate 28 is provided on the main frame member 10 to enable the operator to press down thereupon when depressing the handle or when the operator should desire to push the tilted truck forward by foot.

A further modification of the truck, shown in Figure 4, is provided by this invention. Where articles such as cloth rolls are to be handled and their radius is greater than the height of the fixed rests 20 on hoods 11 and where the truck is to be utilized for lifting articles from platforms, a vertically adjustable lifting means is provided. Vertical members 30, which may conveniently comprise a pair of channels, are mounted on each hood 11. Within these members there is contained a suitable jack or some similar desirable lifting means which are readily available. In the embodiment shown, there is diagrammatically illustrated a hoisting device 31 that may comprise an extension of a suitable ratchet type jack. The hoisting device can be adjustably moved by means of the ratchet 32 shown generally mounted on the vertical members 30. Thus, if the beam or cloth roll is positioned on a platform not wider than the inside width of the truck, the truck may be led under the shaft ends of the warp beam or cloth roll and the lifting device 31 adjustably raised, lifting the beam or cloth roll off the platform. Under such circumstances, the operator does not have to lift the truck but merely to push it under the stub ends and adjust the load carrying members 31. To unload the truck the article is lowered to a desired height then either dumped off or lowered or raised to another platform. Instead of a mechanically operated lifting means, as shown, a hydraulically operated means may be integrated into the truck. With a hydraulic lifting means the article is lifted evenly horizontally, whereas with the mechanical device shown, each end must be separately lifted to raise the article off the platform. However, the use of either type lifting means is one of choice.

Although in the foregoing description of the invention reference was made to the lifting of cylindrically shaped warp beams, it is evident that the handling truck of this invention may also be used with articles having noncylindrical shapes. In addition, of course, the handling truck may be somewhat modified without departing from the spirit of this invention; thus, for example, the handle 21 may be hinged on the frame member 10 so that when the truck is not in use the handle may be swung forward so that the truck will take up less space.

We claim:

1. A truck for handling articles having extending shaft stubs in their ends comprising a main frame member, side members fixed to the ends of said main frame member and extending laterally therefrom, a fixed wheel in each of said side members, a swivel wheel fixed intermediately of said main frame member, a handle fixed to said frame member on either side of said swivel wheel for manually maneuvering the truck, and rests for shaft stubs mounted on each of said side members, said rests being positioned back of the center line of the wheels in said side members so that a load carried by the truck is borne by all of the said wheels.

2. A truck for handling articles having extending shaft stubs in their ends comprising a main frame member, side members fixed at their ends to the ends of said main frame member and extending laterally therefrom, a wheel fixed in each of said side members, a swivel wheel fixed intermediately of said frame member, a handle attached to said main frame member, a counterweight in substantially the forward section of each of said side members for substantially offsetting the weight of the truck back of the wheel centers of the wheels in said side members, rests for shaft stubs on each of said side members, said rests being positioned back of the center line of the wheels in said side members, and said side members substantially extending beyond the contained wheels to prevent the forward overturning of the truck.

3. A truck for handling articles having extending shaft stubs in their ends of the character described in claim 2 in which the length of the main frame member is adjustable.

4. A truck for handling articles having extending shaft stubs in their ends of the character described in claim 2 in which said frame member contains internally thereof members slidably adjusted therein, and means for fixing the adjusted position of said slidable members, said slidable members at one end being rigidly attached to said side members of said truck.

5. A truck for handling articles having extending shaft stubs in their ends of the character described in claim 2 in which said side members comprise hoods substantially encompassing the wheels positioned therein.

6. A truck for handling articles having extending shaft stubs in their ends comprising a main frame member, side members attached to the ends of said main frame member and extending laterally therefrom, a wheel positioned in each of said side members, a swivel wheel fixed intermediately of said main frame member, a handle for manually maneuvering the truck attached to said main frame member and on either side of said swivel wheel, and an adjustable lifting means on said side members having rests for stub shafts the load carried by said rests being on all of said wheels.

7. A truck for handling articles having extending shaft stubs in their ends comprising a generally U-shaped frame having a main frame member, side members fixed to the end of said main frame member and extending therefrom, a wheel fixed in each of said side members, a swivel wheel fixed intermediately of said frame member, a handle for manually maneuvering the truck attached to at least two widely separated points of said main frame member and on either side of said swivel wheel, substantially vertical members positioned on each of said side members, said vertical members including an adjustable lifting means adapted to support said articles by the extended shaft stubs, and said substantially vertical members being positioned on said side members so that the adjustable lifting means carries the lifted article on all three wheels with its center of gravity falling between the wheels of said side members and the pivot swivel wheel.

TOM GROGAN.
THOMAS MAYNER.

REFERENCES CITED

The following references are of record in the file of this patent:

UNITED STATES PATENTS

| Number | Name | Date |
| --- | --- | --- |
| 772,883 | Hines | Oct. 18, 1904 |
| 970,884 | Carter | Sept. 20, 1910 |
| 1,121,807 | Dearborn | Dec. 22, 1914 |
| 1,293,699 | Cannon | Feb. 11, 1919 |
| 1,470,526 | Cade | Oct. 9, 1923 |
| 1,587,842 | Knox | June 8, 1926 |
| 1,598,413 | Armstrong | Aug. 31, 1926 |
| 1,728,519 | Tuerck | Sept. 17, 1929 |
| 1,789,343 | Rogers | Jan. 20, 1931 |
| 1,864,676 | Smith et al. | June 28, 1932 |
| 2,341,350 | Young | Feb. 8, 1944 |

FOREIGN PATENTS

| Number | Country | Date |
| --- | --- | --- |
| 538,165 | Great Britain | July 23, 1941 |